United States Patent
Laine et al.

(10) Patent No.: US 12,545,236 B2
(45) Date of Patent: Feb. 10, 2026

(54) METHOD OF CONTROLLING A VEHICLE COMBINATION

(71) Applicant: Volvo Truck Corporation, Gothenburg (SE)

(72) Inventors: Leo Laine, Härryda (SE); Mats Jonasson, Partille (SE)

(73) Assignee: Volvo Truck Corporation, Gothenburg (SE)

( * ) Notice: Subject to any disclaimer, the term of this patent is extended or adjusted under 35 U.S.C. 154(b) by 268 days.

(21) Appl. No.: 18/034,769

(22) PCT Filed: Nov. 25, 2020

(86) PCT No.: PCT/EP2020/083367
§ 371 (c)(1),
(2) Date: May 1, 2023

(87) PCT Pub. No.: WO2022/111801
PCT Pub. Date: Jun. 2, 2022

(65) Prior Publication Data
US 2023/0398979 A1 Dec. 14, 2023

(51) Int. Cl.
*B60W 30/04* (2006.01)
*B60W 40/10* (2012.01)
(Continued)

(52) U.S. Cl.
CPC ............ *B60W 30/04* (2013.01); *B60W 40/10* (2013.01); *B60W 40/13* (2013.01);
(Continued)

(58) Field of Classification Search
CPC ...... B60W 30/04; B60W 40/10; B60W 40/13; B60W 60/001; B60W 2520/105;
(Continued)

(56) References Cited

U.S. PATENT DOCUMENTS 5,477,739 A   12/1995   Holler et al.
6,139,118 A   10/2000   Hurst et al.
(Continued)

FOREIGN PATENT DOCUMENTS

CN   102582686 A   7/2012
CN   107000741 A   8/2017
(Continued)

OTHER PUBLICATIONS

International Search Report and Written Opinion for International Patent Application No. PCT/EP2020/083367, mailed Sep. 6, 2021, 12 pages.
(Continued)

*Primary Examiner* — Jason Holloway
*Assistant Examiner* — Madison B Emmett
(74) *Attorney, Agent, or Firm* — Withrow & Terranova, PLLC

(57) ABSTRACT

A method of controlling a vehicle combination, the vehicle combination comprising a first vehicle unit, a second vehicle unit and an articulated coupling connecting the first and second vehicle units to each other, the method comprising determining a coupling force parameter of the articulated coupling based on a combination of motion related parameters obtained from the first and second vehicle units; selecting an operational envelope for the vehicle combination based on the coupling force parameter; and controlling the vehicle combination to operate within the operational envelope.

17 Claims, 6 Drawing Sheets

(51) Int. Cl.
B60W 40/13 (2012.01)
B60W 60/00 (2020.01)

(52) U.S. Cl.
CPC ..... B60W 60/001 (2020.02); *B60W 2520/105* (2013.01); *B60W 2520/125* (2013.01); *B60W 2530/10* (2013.01); *B60W 2530/203* (2020.02); *B60W 2710/20* (2013.01)

(58) Field of Classification Search
CPC ....... B60W 2520/125; B60W 2530/10; B60W 2530/203; B60W 2710/20; B60W 2530/207; B60W 2710/207; B60W 2720/106; B62D 53/08
See application file for complete search history.

(56) References Cited

U.S. PATENT DOCUMENTS

| | | | |
|---|---|---|---|
| 2001/0018630 A1 | 8/2001 | Wetzel et al. | |
| 2007/0260386 A1* | 11/2007 | Tandy | B60T 8/1755 280/400 |
| 2013/0018552 A1 | 1/2013 | Foster et al. | |
| 2015/0165850 A1* | 6/2015 | Chiu | B60D 1/30 701/1 |
| 2016/0229394 A1* | 8/2016 | Fujii | B60W 30/02 |
| 2018/0265078 A1 | 9/2018 | Cervantes et al. | |
| 2020/0130703 A1* | 4/2020 | Pendelton | B60W 40/09 |
| 2020/0142405 A1* | 5/2020 | Havens | G05D 1/0088 |
| 2021/0114597 A1* | 4/2021 | Tagesson | B60W 50/0097 |
| 2022/0048497 A1* | 2/2022 | Delizo | G05D 1/0251 |
| 2022/0332307 A1* | 10/2022 | McClain | B60D 1/30 |

FOREIGN PATENT DOCUMENTS

| | | |
|---|---|---|
| DE | 19621671 A1 | 12/1997 |
| DE | 102014224808 A1 | 6/2016 |
| EP | 2492162 A2 | 8/2012 |
| EP | 2492162 A3 | 6/2018 |
| RU | 2013652 C1 | 5/1994 |
| WO | 2020049919 A1 | 3/2020 |

OTHER PUBLICATIONS

First Office Action for Chinese Patent Application No. 202080107295.6, mailed Nov. 6, 2024, 9 pages.

* cited by examiner

METHOD OF CONTROLLING A VEHICLE COMBINATION

This application is a 35 USC 371 national phase filing of International Application No. PCT/EP2020/083367, filed Nov. 25, 2020, the disclosure of which is incorporated herein by reference in its entirety.

TECHNICAL FIELD

The present disclosure relates to a method of controlling a vehicle combination. The present disclosure also relates to a control system as well as a vehicle combination comprising such a control system. The present disclosure is applicable to vehicle combinations comprising at least a towing vehicle and a towed vehicle connected to each other by an articulated coupling. Although the disclosure will mainly be directed to a vehicle combination in the form of a truck-trailer, it may also be applicable for other types of vehicles such using vehicle units connected by articulated couplings, such as e.g. working machines.

BACKGROUND

In order to increase the operational capacity of heavy-duty vehicles, vehicle combinations with a plurality of units are increasingly popular. Hereby, the vehicle is able to transport a substantive amount of material when driving from one position to another. These vehicle units are also referred to as multi-trailers. Each unit of the multi-trailer is connected to another unit by means of an articulated coupling allowing a mutual rotation between the units.

During operation of such a multi-trailer, an important aspect to consider is the forces that generates in the coupling between the units, in order to be able to safely control the vehicle during operation.

The forces generated during operation can be obtained by using force sensors in the articulated coupling joint. However, such sensors are expensive and the output force signal from the sensor(s) is/are not always reliable as a sensor in this position of the vehicle is at high risk of being exposed to damage.

There is thus a desire to control a vehicle combination based on improved accuracy of the forces exposed to the articulated coupling, to thereby improve the operational safety of such vehicle combination.

SUMMARY

It is thus an object of the present disclosure to at least partially overcome the above described deficiencies. This object is achieved by a method according to claim 1.

According to a first aspect, there is provided a method of controlling a vehicle combination, the vehicle combination comprising a first vehicle unit, a second vehicle unit and an articulated coupling connecting the first and second vehicle units to each other, the method comprising determining a coupling force parameter of the articulated coupling based on a combination of motion related parameters obtained from the first and second vehicle units; selecting an operational envelope for the vehicle combination based on the coupling force parameter; and controlling the vehicle combination to operate within the operational envelope.

The wording "coupling force parameter" should be construed as relating to various types of force parameters, as will be described below with reference to different example embodiments. As will be described further below, a coupling force parameter may, for example, be a weight value, a force value and a torque/moment value, etc. The motion related parameter may on the other hand relate to the velocity of the vehicle, an angle between the vehicle units, etc. The motion related parameters are thus generated at the first and second vehicle units and transmitted to e.g. a control system of the vehicle combination.

Moreover, the operational envelope should be construed to describe how the vehicle combination should be operated based on the coupling force parameters. Thus, the operational envelope defines various operating conditions the vehicle combination should fulfil to operate in a safe manner. According to an example embodiment, the operational envelope may be based on at least one of a maximum acceleration, maximum deceleration and maximum steering angle. According to a further example, the operational envelope may also be based on an increase and/or decrease of the length (when such length is adjustable) of the vehicle combination.

An advantage of the present disclosure is thus that the vehicle will be controlled in a selected operational envelope based on the coupling force parameters, which will enable the vehicle combination to be propelled with reduced risk of e.g. arriving at a roll over situation or accidentally driving off the road due to a too high vehicle speed.

By determining the coupling force parameter based on a combination of motion related parameters from the first and the second vehicle units, an improved determination/estimation of the actual forces is achieved, whereby the selection of suitable operational envelope is also improved, i.e. there is a reduced risk of selecting an operational envelope that does not reflect the actual forces exposed to the articulated coupling. Thus, by selecting an operational envelope based on the coupling force parameters a proper and safe driving condition can be achieved.

Also, by determining the coupling forces, a distribution of propulsion and braking can be selected and controlled in a suitable manner. Hereby, so-called jack-knifing and swing-out can be avoided. Jack-knifing should be construed as, for example, a situation where the truck is braking too much and the trailer is pushing on the articulated coupling. Hereby, there is a risk that the first and second vehicle will be exposed to a jack-knife at the articulated coupling, i.e. the articulated angle between the first and second vehicle units will be too severe. Jack-knifing can otherwise occur at, for example, situations when driving downhill at low friction between the surface of the tires on the axle behind the articulated coupling, i.e. the axle(s) on the second vehicle unit, and the road surface. This axle positioned behind the articulated coupling is thus in many cases arranged to provide an engine braking operation and/or a regenerative braking operation for the vehicle. During e.g. braking, the wheels/tires might lose the lateral grip force to the ground surface which makes the first vehicle unit prone for jack-knifing when the second vehicle unit, i.e. the trailer is pushing. Low friction and poor normal force distribution on the vehicle combination can lead to a jack-knife situation. For example, in a tractor-trailer combination, the rear part of the trailer can be heavily laden, while the front part of the trailer is less laden. This can lead to low vertical load transfer in a fifth wheel above the driven wheels. If braking is conducted using the driveline, the vehicle combination becomes vulnerable to jack-knifing due to the low normal force. Accordingly, the articulated coupling is exposed to a compression force and the lateral wheel forces cannot counteract this increased compression force. Swing-out should on the other hand be construed such that the tires of the second vehicle unit, i.e. the tires of the trailer, loses lateral grip on the road, whereby the trailer risk swinging laterally relative to the first vehicle unit, i.e. the truck. The swing-out situation could occur during increased braking of the rear vehicle unit, i.e. the trailer, whereby the wheels of the trailer loses their grip to the road surface.

According to an example embodiment, the motion related parameters may comprise an obtained first acceleration value indicative of an acceleration component of the first vehicle unit, and an obtained second acceleration value indicative of an acceleration component of the second vehicle unit. The first and second acceleration values may relate to a longitudinal and/or a lateral acceleration value of the first and second vehicle units, or a vector defining the sum of the longitudinal and lateral acceleration values. The acceleration values may be determined by using a suitable sensor, such as an inertial measurement unit (IMU) arranged on each of the first and second vehicle units.

According to an example embodiment, the motion related parameters may comprise an obtained first angular acceleration value indicative of an angular acceleration of the first vehicle unit, and an obtained second angular acceleration value indicative of angular acceleration of the second vehicle unit. The angular acceleration of the first vehicle unit should be construed as being an angular acceleration around a substantially vertical geometric axis positioned at the center of mass of the first vehicle unit. In a similar vein, the angular acceleration of the second vehicle unit should be construed as being an angular acceleration around a substantially vertical geometric axis positioned at the center of mass of the second vehicle unit. The angular acceleration values may be determined by using a suitable sensor, such as an inertial measurement unit (IMU) arranged on each of the first and second vehicle units.

According to an example embodiment, the motion related parameters may comprise an obtained first wheel force value indicative of a longitudinal wheel force of at least one wheel of the first vehicle unit, and an obtained second wheel force value indicative of a longitudinal wheel force of at least one wheel of the second vehicle unit.

According to an example embodiment, the obtained first and second wheel force values indicative of the longitudinal wheel force may be obtained from an actuator connected to the at least one wheel of the first and second vehicle units, respectively.

Hereby, the longitudinal wheel force may be obtained by dividing the applied wheel torque with the wheel radius. The wheel force values are thus obtained during traction and/or braking, and can be defined as the sum of the longitudinal wheel forces for the different wheels of the respective first and second vehicle units.

According to an example embodiment, the motion related parameters may comprise an obtained angle value indicative of an articulated angle between the first and second vehicle units. Hereby, the relative angle between the first and second vehicle units is accounted for when determining the coupling force parameter.

According to an example embodiment, the coupling force parameter may be further based on an obtained weight value indicative of the weight of the first and second vehicle units, respectively.

The weight of the first and second vehicle units may be determined in a number of manners. For example, an unladen weight may be known, whereby the loads provided to the vehicle is measured such that the current weight of the laden vehicle can be determined. The weight may also be determined by measuring a pressure level of a vehicle suspension arrangement, such as an air suspension or hydraulic suspension of the vehicle units.

According to an example embodiment, the coupling force parameter may comprise a longitudinal force component and a transversal force component as seen relative to the longitudinal direction of the first vehicle unit. Determining the longitudinal and transversal forces of the vehicle units is beneficial as it enables for a determination of vehicle stability in the longitudinal and transversal direction when selecting an operational envelope.

According to an example embodiment, the coupling force parameter may comprise a coupling torque component, the coupling torque component exposing the articulated coupling to a torque around a longitudinally extending geometric axis.

An advantage is that the risk of accidentally arriving at a roll-over situation can be determined. Thus, the operational envelope can be selected, based on the torque component, such as to reduce the risk that e.g. the second vehicle unit rolls over relative to the first vehicle unit.

According to an example embodiment, the coupling force parameter may comprise a vertical force component. The vertical force component is advantageous as it can be used to determine a load transfer between the first and second vehicle units, at the articulated coupling.

According to an example embodiment, the motion related parameters may comprise an obtained vertical force value indicative of a vertical wheel force of at least one wheel of the second vehicle unit. Hereby, the wheel vertical force values of the second vehicle unit can be used for determining the coupling torque around a substantially longitudinal geometric axis of the articulated coupling. The vertical wheel forces exposed to the wheels of the first vehicle unit may also be used when determining the coupling torque. The coupling torque is, as described above, advantageously used when selecting the operational envelope for preventing a roll over situation. The vertical wheel forces may be determined based on input signals from e.g. a sensor arranged to detect lateral acceleration and/or yaw rate.

According to a second aspect, there is provided a control system for controlling a vehicle combination comprising a first vehicle unit, a second vehicle unit and an articulated coupling connecting the first and second vehicle units to each other, wherein the control system is configured to be connected to a vehicle propulsion system, wherein the control system comprises control circuitry configured to determine a coupling force parameter of the articulated coupling based on a combination of motion related parameters of the first vehicle unit and the second vehicle unit; select an operational envelope for the vehicle combination based on the coupling force parameter; and transmit a control signal to a vehicle propulsion system, the control signal representing instructions to operate the vehicle combination within the operational envelope.

The motion related parameters may be obtained from motion related sensors arranged on the first and second vehicle units, respectively. Thus, according to an example embodiment, the first vehicle unit may comprise a first motion related sensor and the second vehicle unit may comprise a second motion related sensor.

As an alternative, if the articulated coupling uses a hydraulic pressure arrangement for connecting the first and second vehicle units to each other, the motion related parameters may be determined based on a hydraulic pressure level of the hydraulic pressure arrangement.

Further effects and features of the second aspect are largely analogous to those described above in relation to the first aspect.

According to a third aspect, there is provided a vehicle combination comprising a first vehicle unit, a second vehicle unit, an articulated coupling connecting the first and second vehicle units to each other, a vehicle propulsion system arranged to propel the vehicle during operation, and a control system according to the above described second aspect.

According to an example embodiment the first vehicle unit may be an autonomously controlled vehicle.

According to a fourth aspect, there is provided a computer program comprising program code means for performing the steps of any one of the embodiments described above in relation to the first aspect when the program is run on a computer.

According to a fifth aspect, there is provided a computer readable medium carrying a computer program comprising program means for performing the steps of any one of the embodiments described above in relation to the first aspect when the program means is run on a computer.

Effects and features of the third, fourth and fifth aspects are largely analogous to those described above in relation to the first and second aspects.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
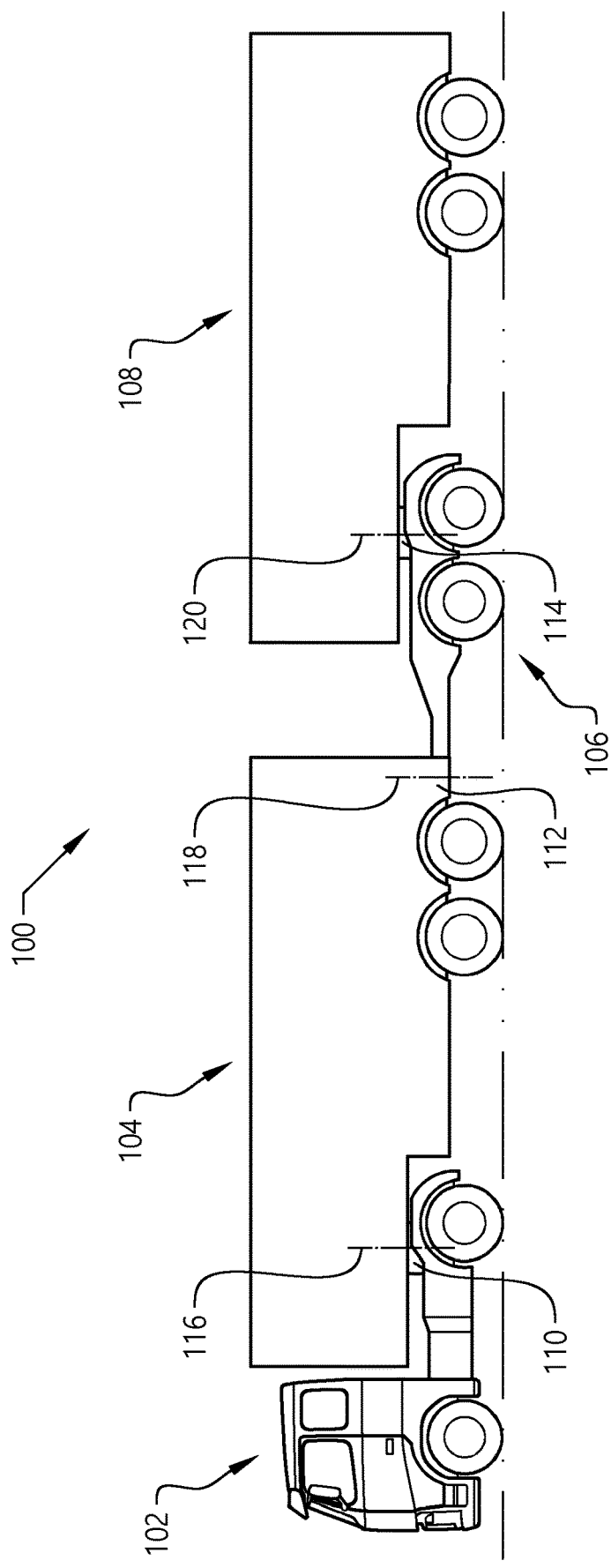
FIG. 1 is a lateral side view illustrating an example embodiment of a vehicle combination in the form of a truck, where the vehicle combination comprises a first and a second vehicle unit.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle combination 100 in the form of a multi-trailer truck 100. The vehicle combination 100 comprises a first vehicle unit 102, a second vehicle unit 104, a third vehicle unit 106 and a fourth vehicle unit 108. The first vehicle unit 102 is a tractor unit, a trailing unit, while the second 104 and fourth 108 vehicle units are arranged as trailer units, and the third vehicle unit 106 is a dolly arranged between the second 104 and fourth 108 vehicle units. Although the vehicle combination 100 depicted in FIG. 1 comprises four vehicle units, the present disclosure is equally applicable for a vehicle combination comprising arbitrary many vehicle units, such as e.g. also a fifth, a sixth, a seventh vehicle unit, etc.

Moreover, the first vehicle unit 102 is connected to the second vehicle unit 104 by a first articulate coupling 110, the second vehicle unit 104 is connected to the third vehicle unit 106 by a second articulate coupling 112, and the third vehicle unit 106 is connected to the fourth vehicle unit 108 by a third articulate coupling 114. Hereby, the vehicle units are allowed to rotate relative to each other around a respective first 116, second 118 and third 120 substantially vertical geometric axis.

During operation, the articulated couplings 110, 112, 114 of the vehicle combination 100 are exposed to coupling forces, such as e.g. longitudinal and lateral forces, as well as torque loads. These coupling forces are generated during operation of the vehicle combination. In order to describe these coupling force parameters in further detail, reference is made to FIGS. 2-5 which illustrate an example embodiment of a vehicle combination 100 comprising the first 102 and the second 104 vehicle units. Thus, the following disclosure will, for simplicity of understanding, not include the third 106 and fourth 108 vehicle units of the vehicle combination in FIG. 1. However, it should be readily understood that the coupling force parameters of the second 112 and third 114 articulated couplings are determined in a similar manner as for the first articulated coupling 110 described below.

Figure 2:
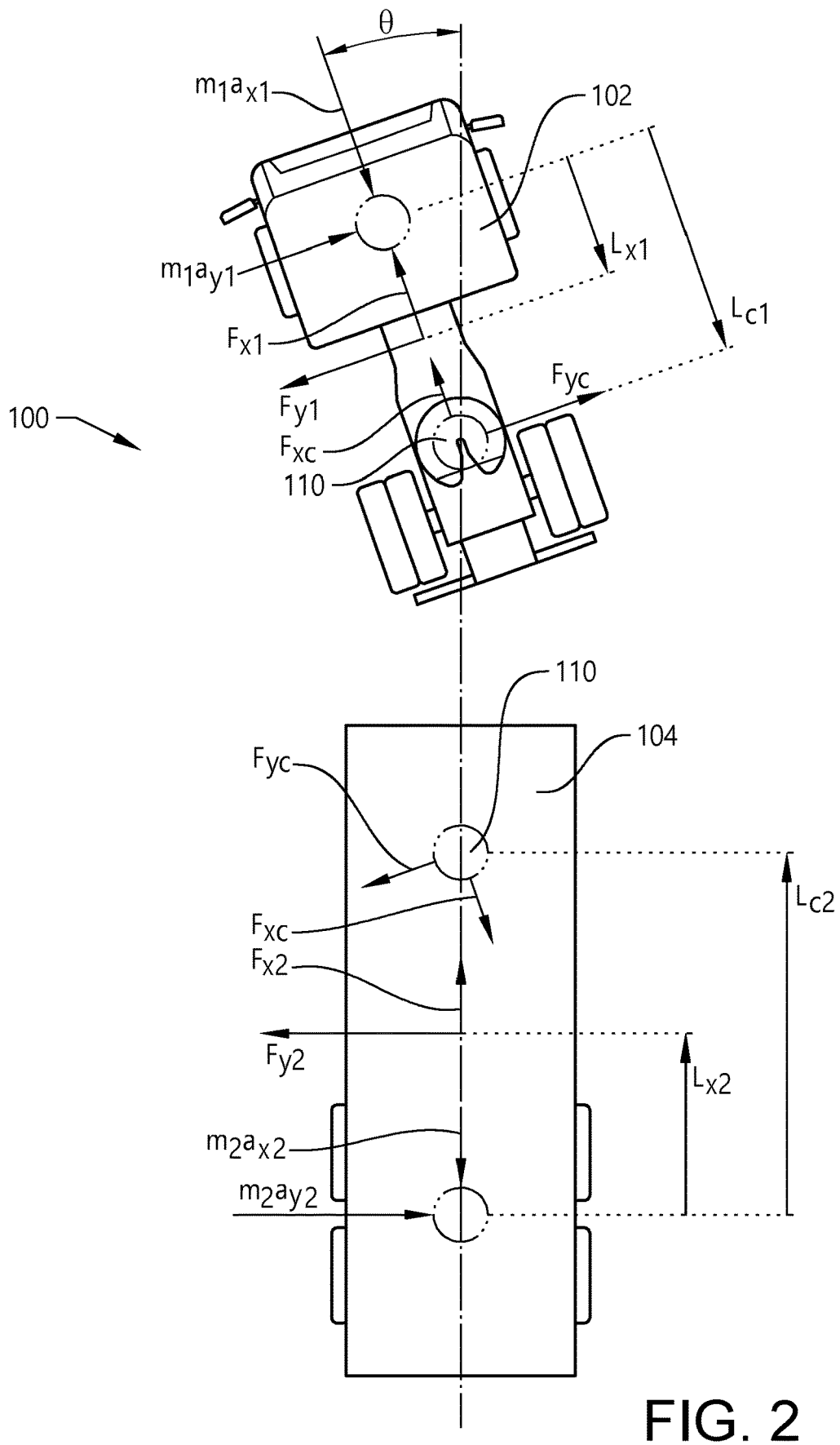
FIG. 2 is a top view of the first and second vehicle units of FIG. 1.

Starting with FIG. 2, which is a top view of the first and second vehicle units of FIG. 1. The vehicle combination 100 is in FIG. 2 arranged in a somewhat exploded view so that the first vehicle unit 102 is separated from the second vehicle unit 104. Thus, FIG. 2 is exploded in this manner to simplify the illustration of the coupling force parameters of the first articulated coupling 110 as well as the motion related parameters obtained from the first 102 and second 104 vehicle units.

As can be seen in FIG. 2, the first vehicle unit 102 turns to the left by an articulated angle $\theta$. Thus, the first vehicle unit 102 and the second vehicle unit 104 are rotated relative to each other around the articulated coupling 110 by the articulated angle $\theta$. The articulated angle $\theta$ can be measured by e.g. an angle sensor, an input signal from the steering wheel, and/or from an Advanced driver-assistance system (ADAS). Further, during propulsion, the vehicle is exposed to a longitudinal acceleration component, $a_{x1}$, and a lateral acceleration $a_{y1}$. The lateral acceleration $a_{y1}$ is generated as the first vehicle unit 102 is turning. The longitudinal and lateral acceleration components can be determined by means of inertial measurement units (IMUs) or similar sensors.

The second vehicle unit 104 is exposed to a longitudinal acceleration component, $a_{x2}$, as can also be obtained by an IMU. As the second vehicle unit 104 in FIG. 2 is still operated straight forward, it is not exposed to a lateral acceleration component at this stage.

Furthermore, when the vehicle combination is operated, actuation forces, $F_{x1}$ and $F_{x2}$, of the first 102 and second 104 vehicle units can be obtained from actuators of the vehicle, such as e.g. electric machines configured to generate an operating torque on the propelled wheels of the respective first 102 and second 104 vehicle units. Based on the above described motion related parameters, the following equations (1)-(6) can be generated to determine the coupling force parameters of the articulated coupling.

$$m_1 a_{x1} = F_{x1} + F_{xc} \quad (1)$$

$$m_2 a_{x2} = F_{x2} - F_{xc}\cos(\theta) - F_{yc}\sin(\theta) \quad (2)$$

$$m_1 a_{y1} = F_{y1} - F_{yc} \quad (3)$$

$$m_2 a_{y2} = F_{y2} - F_{xc}\sin(\theta) + F_{yc}\cos(\theta) \quad (4)$$

$$J_{z1}\dot{\omega}_{z1} = -F_{y1}L_{x1} + F_{yc}L_{c1} \quad (5)$$

$$J_{z2}\dot{\omega}_{z2} = F_{y2}L_{x2} + L_{c2}(F_{xc}\sin(\theta) + F_{yc}\cos(\theta)) \quad (6)$$

Where:
$m_1$ is the mass of the first vehicle unit 102;
$m_2$ is the mass of the second vehicle unit 104;
$\dot{\omega}_{z1}$ is the angular acceleration of the first vehicle unit 102;
$\dot{\omega}_{z2}$ is the angular acceleration of the second vehicle unit 104;
$F_{y1}$ is the lateral forces generated on the first vehicle unit 102;
$F_{y2}$ is the lateral forces generated on the second vehicle unit 104;
$J_{z1}$ is the moment of inertia of the first vehicle unit 102;
$J_{z2}$ is the moment of inertia of the second vehicle unit 104;
$L_{x1}$ is the longitudinal length from the center of mass of the first vehicle unit 102 to a position at which the lumped tractive force $F_{x1}$ is exposed to the first vehicle unit 102;
$L_{c1}$ is the longitudinal length from the center of mass of the first vehicle unit 102 to the position of the articulated coupling 110;
$L_{x2}$ is the longitudinal length from the center of mass of the second vehicle unit 104 to a position at which the lumped tractive force $F_{x2}$ is exposed to the second vehicle unit 104;
$L_{c2}$ is the longitudinal length from the center of mass of the second vehicle unit 104 to the position of the articulated coupling 110;
$F_{xc}$ is the longitudinal coupling force component as seen in a local coordinate system of the first vehicle unit 102; and
$F_{yc}$ is the lateral coupling force component as seen in a local coordinate system of the first vehicle unit 102.

The angular accelerations $\dot{\omega}_{z1}$ and $\dot{\omega}_{z2}$ can, in a similar manner as the longitudinal and lateral acceleration components be determined by obtaining a signal from an IMU or similar sensor. The mass of the first 102 and second 104 vehicle units, as well as the moments of inertia $J_{z1}$ and $J_{z2}$ are also known beforehand.

Thus, the above equations (1)-(6) contains the known parameters $m_1$, $m_2$, $a_{x1}$, $a_{x2}$, $a_{y1}$, $\dot{\omega}_{z1}$, $\dot{\omega}_{z2}$, $J_{z1}$ and $J_{z2}$ and the unknown parameters $F_{xc}$, $F_{yc}$, $F_{y1}$ $F_{y2}$ $L_{x1}$ $L_{x2}$. Thus, six equations and six unknown parameters, which presents an equation system which is solvable. In particular, the coupling force parameters $F_{xc}$ and $F_{yz}$ can be determined, which can be used for the application as described further below in relation to FIG. 7.

The above described longitudinal forces $F_{x1}$ and $F_{x2}$ are thus the sum of wheel torques, i.e. actuated torque from brake and/or propulsion units, among the wheels of the respective vehicle unit divided by the wheel radius.

Figure 3:
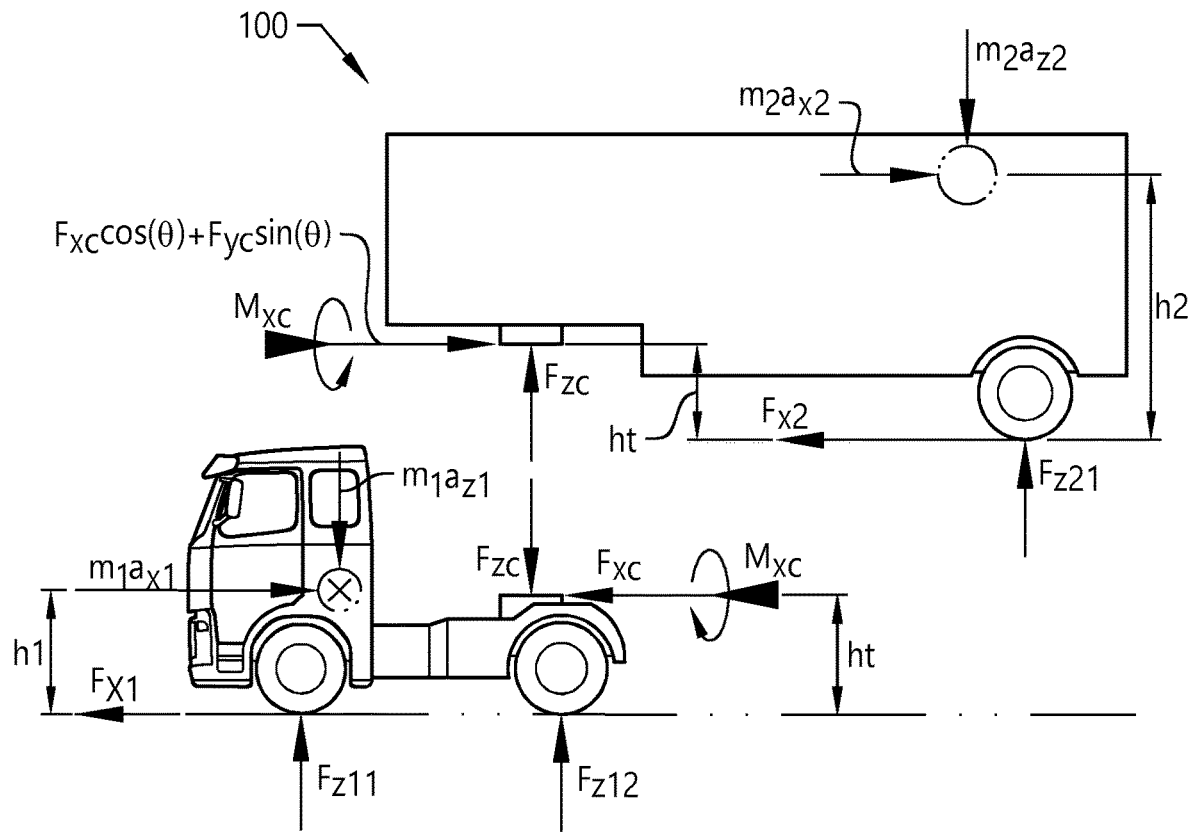
FIG. 3 is a side view of the first and second vehicle units of FIG. 1.
Figure 4:
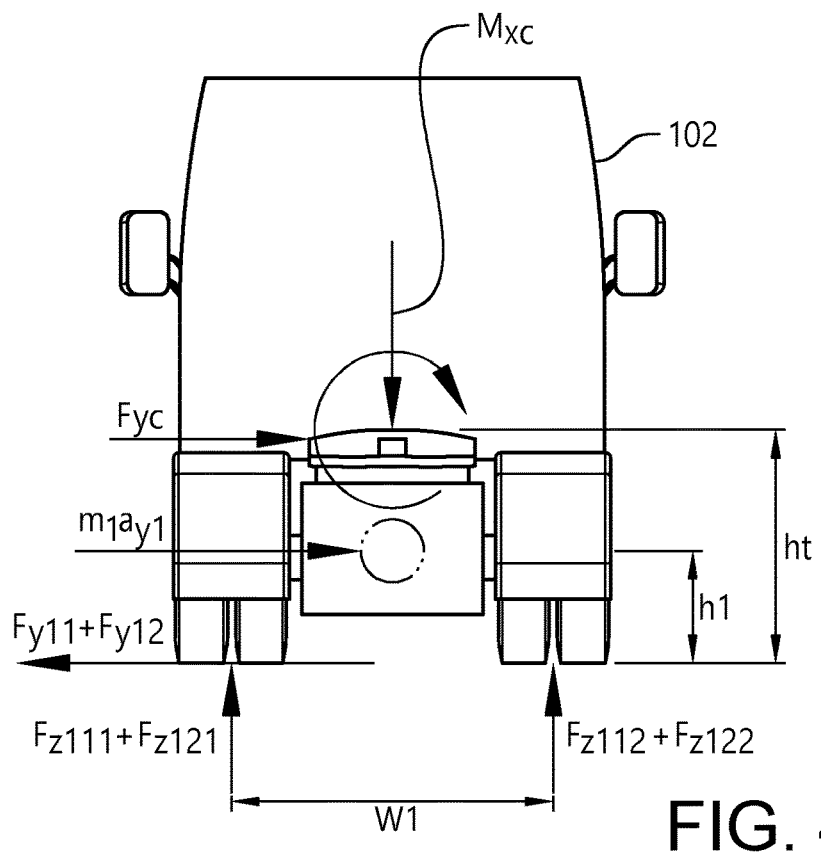
FIG. 4 is a rear view of the first vehicle unit in the vehicle combination in FIG. 1.
Figure 5:
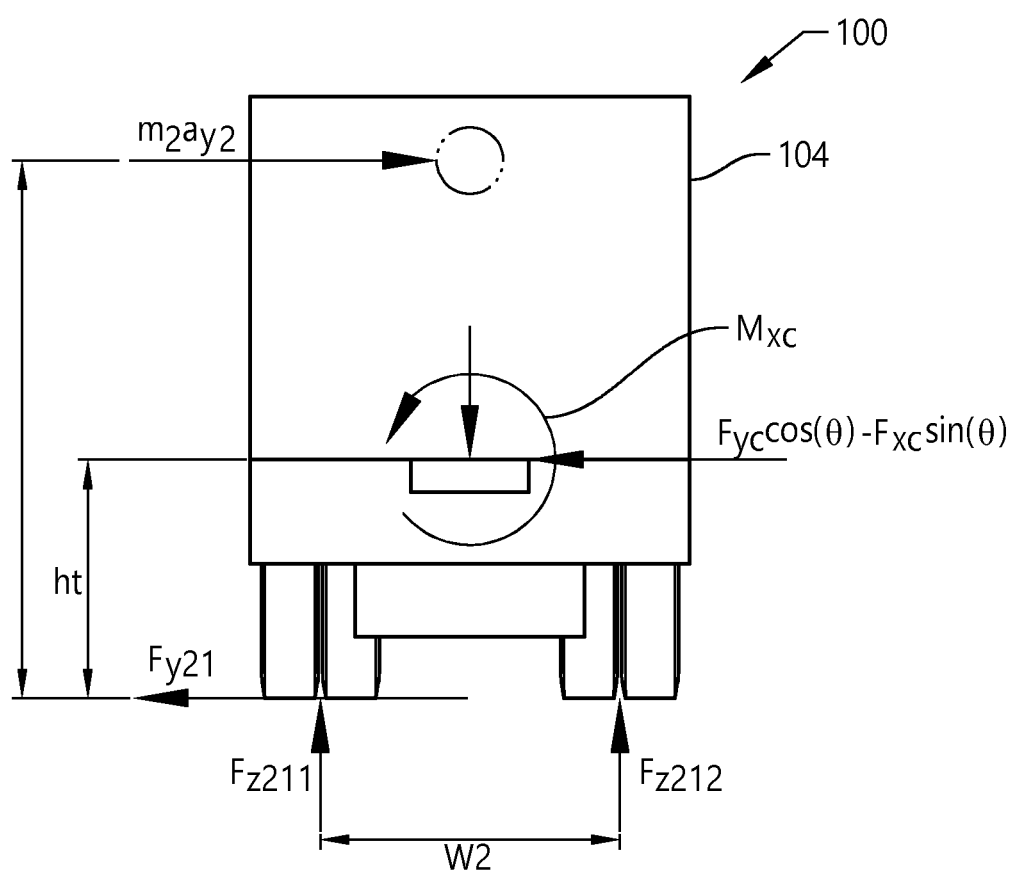
FIG. 5 is a rear view of the second vehicle unit in the vehicle combination in FIG. 1.

Turning now to FIGS. 3-5, which are a side view and rear views of the vehicle combination 100 according to an example embodiment. In particular, FIG. 4 is a rear view of the first vehicle unit 102 and FIG. 5 is a rear view of the second vehicle unit 104. Motion related parameters already described in relation to FIG. 2 will not be described in further detail below but should be construed as also being present for the illustrations of FIGS. 3-5.

From the illustrations of FIGS. 3-5, the following equations (7)-(19) can be generated:

$$M_{xc} + F_{z212} \times \frac{W_2}{2} - F_{z211} \times \frac{W_2}{2} - m_2 a_{y2}(h_2 - h_t) = 0 \quad (7)$$

$$M_{xc} + (F_{z111} + F_{z121}) \times \frac{W_1}{2} - (F_{z112} + F_{z122}) \times \frac{W_1}{2} - m_1 a_{y1}(h_t - h_1) = 0 \quad (8)$$

$$F_{zc} + F_{z21} - m_2 a_{z2} = 0 \quad (9)$$

$$-F_{zc} + F_{z11} + F_{z12} - m_1 a_{z1} = 0 \quad (10)$$

$$F_{z11} = F_{z111} + F_{z112} \quad (11)$$

$$F_{z12} = F_{z121} + F_{z122} \quad (12)$$

$$F_{z21} = F_{z211} + F_{z212} \quad (13)$$

$$F_{xc}\cos(\theta) + F_{yc}\sin(\theta) + m_2 a_{x2} - F_{x2} = 0 \quad (14)$$

$$F_{xc} + F_{x1} - m_1 a_{x1} = 0 \quad (15)$$

$$F_{yc} = F_{y11} + F_{y12} - m_1 a_{y1} \quad (16)$$

$$F_{yc}\cos(\theta) - F_{xc}\sin(\theta) - m_2 a_{y2} + F_{y21} = 0 \quad (17)$$

$$F_{x1} \times h_t - m_1 a_{x1} \times (h_t - h_1) = 0 \quad (18)$$

$$m_2 a_{x2} \times (h_2 - h_t) - F_{x2} \times h_t = 0 \quad (19)$$

As described above in relation to the description if FIG. 2, the acceleration parameters can be determined by e.g. IMUs and the tractive forces can be obtained from the actuators. Hereby, the vertical coupling force $F_{yc}$ and the coupling torque $M_{xc}$ of the articulated coupling can be determined.

Figure 6:
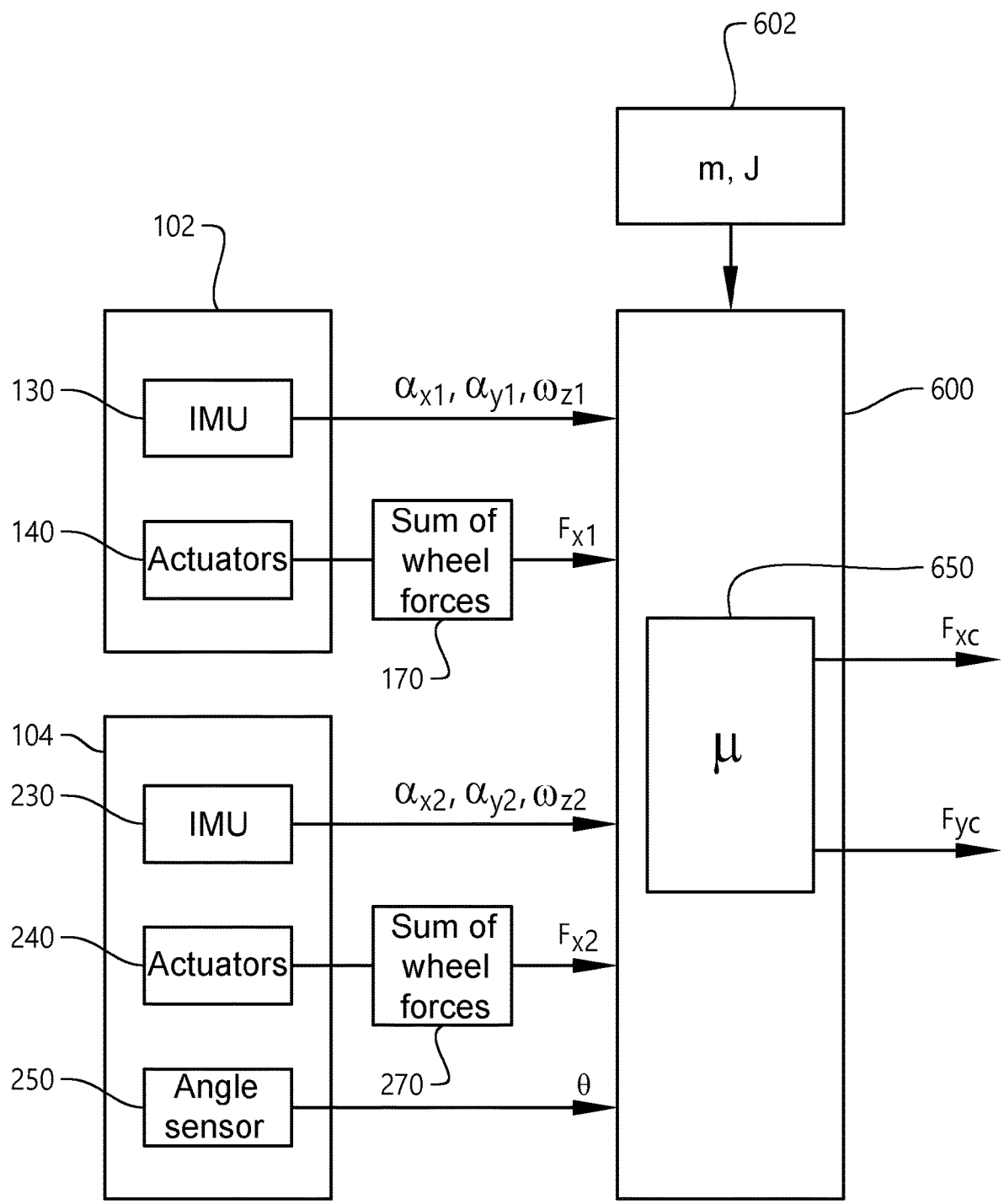
FIG. 6 is a control system for controlling the vehicle combination in FIG. 1 according to an example embodiment.

Turning to FIG. 6 which illustrates a control system 600 according to the present disclosure. The control system 600 depicted in FIG. 6 is arranged to determine the above described longitudinal coupling force $F_{xc}$ and lateral coupling force $F_{yz}$. It should however be readily understood that the control system 600 is equally applicable for determining the vertical coupling force $F_{xc}$ and the coupling torque $M_{xc}$ by implementing also the equations (7)-(19) described above.

The control system 600 comprises control circuitry 650 which may each include a microprocessor, microcontroller, programmable digital signal processor or another programmable device. The control circuitry 650 may also, or instead, each include an application specific integrated circuit, a programmable gate array or programmable array logic, a programmable logic device, or a digital signal processor. Where the control circuitry 650 includes a programmable device such as the microprocessor, microcontroller or programmable digital signal processor mentioned above, the processor may further include computer executable code that controls operation of the programmable device. It should be understood that all or some parts of the functionality provided by means of the control circuitry 650 may be at least partly integrated with the below described IMUs 130, 230, actuators 140, 240, angle sensor 250 and mass and inertia estimator 602.

As can be seen, the control system 600 receives a longitudinal acceleration component $a_{x1}$, a lateral acceleration component $a_{y1}$ and a rotational velocity component $\omega_{z1}$ from an IMU 130 of the first vehicle unit 102. The control system 600 also receives longitudinal wheel forces $F_{x1}$ from the first vehicle unit 102, which are defined as a sum, calculated by a first force summation module 170, of longitudinal wheel forces received from actuators 140 of the first vehicle unit 102.

Moreover, the control system receives a longitudinal acceleration component $a_{x2}$, a lateral acceleration component $a_{y2}$ and a rotational velocity component $\omega_{z2}$ from an IMU 230 of the second vehicle unit 104. The control system 600 also receives longitudinal wheel forces $F_{x2}$ from the second vehicle unit 104, which are defined as a sum, calculated by a second force summation module 270, of longitudinal wheel forces received from actuators 240 of the second vehicle unit 104. Also, the control system receives an articulated angle $\theta$ of the articulated coupling 110, i.e. the relative angular displacement between the first 102 and second 104 vehicle units. Although FIG. 6 illustrates that the articulated angle is received from an angle sensor 250 of the second vehicle unit 104, this angle sensor 250 can equally form part of the first vehicle unit 102.

Moreover, the control system 600 receives parameter values indicative of vehicle mass m and moment of inertia J from a mass and inertia estimator 602. Thus, the mass and inertia estimator 602 is arranged to transmit parameter values indicative of the mass $m_1$ of the first vehicle unit 102, the mass $m_2$ of the second vehicle unit 104, the moment of inertia $J_1$ of the first vehicle unit 102 and the moment of inertia $J_2$ of the second vehicle unit 104.

When receiving the motion related parameters of the first 102 and second 104 vehicle units, the control system determines, based on the above described equations, the coupling force parameters, here indicated as the longitudinal $F_{xc}$ and lateral $F_{yc}$ coupling force parameters, of the articulated coupling.

Figure 7:
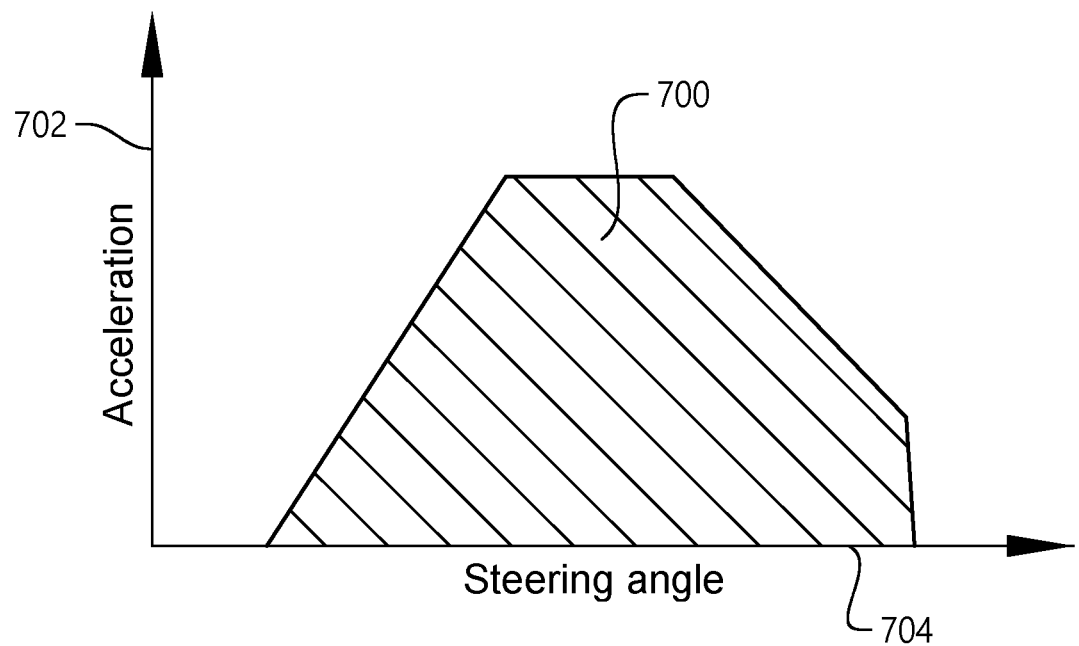
FIG. 7 is a diagram illustrating an operational envelope for the vehicle combination according to an example embodiment.

Based on the coupling force parameters, the vehicle combination is controlled to operate within an operational envelope, as is exemplified in FIG. 7. The control system 600 thus, based on the determined coupling force parameters, selects an operational envelope within which the vehicle should be controlled. In the example of FIG. 7, the vertical axis 702 represents the longitudinal acceleration of the vehicle combination and the horizontal axis 704 represents the steering angle. The operational envelope 700 may of course be based on other control parameters as well, such as an increase and/or decrease of the length (when such length is adjustable) of the vehicle combination, vehicle speed, etc. Accordingly, the operational envelope defines operating conditions that the vehicle combination should fulfil to be operated in a safe manner.

Figure 8:
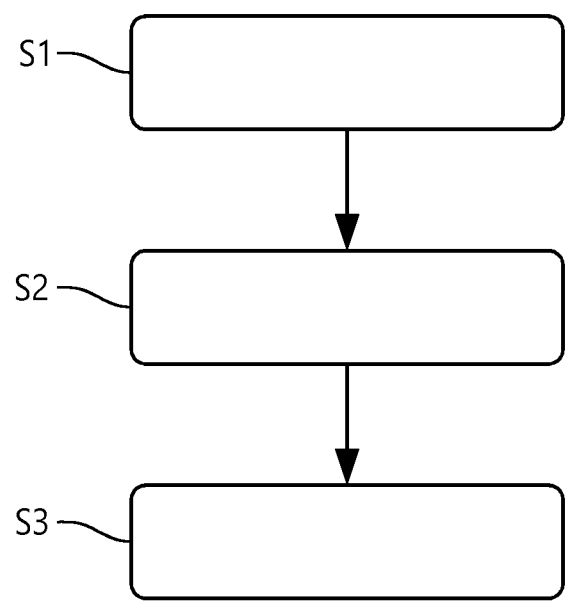
FIG. 8 is a flow chart of a method for controlling the vehicle combination in FIG. 1 according to an example embodiment.

In order to sum up, reference is made to FIG. 8, which is a flow chart of a method for controlling the above described vehicle combination according to an example embodiment. During operation of the vehicle combination, at least one of the coupling force parameters is determined S1 based on the combination of motion related parameters obtained from the first 102 and second 104 vehicle units. These motion related parameters are described in detail above with reference to FIGS. 2-5.

Thereafter, an operational envelope 700 is selected S2 for the vehicle combination 100 based on the determined coupling force parameters of the articulated coupling 110. The vehicle combination is thereafter, for being safely operated, controlled S3 to operate within the selected operational envelope 700.

It is to be understood that the present disclosure is not limited to the embodiments described above and illustrated in the drawings; rather, the skilled person will recognize that many changes and modifications may be made within the scope of the appended claims.

The invention claimed is:

1. A method of controlling a vehicle combination, the vehicle combination comprising a first vehicle unit, a second vehicle unit, and an articulated coupling connecting the first and second vehicle units to each other, the method comprising:
   determining a coupling force parameter of the articulated coupling based on a combination of motion related parameters obtained from the first and second vehicle units;
   selecting an operational envelope for the vehicle combination based on the coupling force parameter; and
   controlling the vehicle combination to operate within the operational envelope and proactively avoid exceeding the operational envelope.

2. The method of claim 1, wherein the motion related parameters comprise an obtained first acceleration value indicative of an acceleration component of the first vehicle unit, and an obtained second acceleration value indicative of an acceleration component of the second vehicle unit.

3. The method of claim 1, wherein the motion related parameters comprise an obtained first angular acceleration value indicative of an angular acceleration of the first vehicle unit, and an obtained second angular acceleration value indicative of angular acceleration of the second vehicle unit.

4. The method of claim 1, wherein the motion related parameters comprise an obtained first wheel force value indicative of a longitudinal wheel force of at least one wheel of the first vehicle unit, and an obtained second wheel force value indicative of a longitudinal wheel force of at least one wheel of the second vehicle unit.

5. The method of claim 4, wherein the obtained first and second wheel force values indicative of the longitudinal wheel force are obtained from an actuator connected to the at least one wheel of the first and second vehicle units, respectively.

6. The method of claim 1, wherein the motion related parameters comprise an obtained angle value indicative of an articulated angle between the first and second vehicle units.

7. The method of claim 1, wherein the coupling force parameter is further based on an obtained weight value indicative of the weight of the first and second vehicle units, respectively.

8. The method of claim 1, wherein the coupling force parameter comprises a longitudinal force component and a transversal force component as seen relative to the longitudinal direction of the first vehicle unit.

9. The method of claim 1, wherein the coupling force parameter comprises a coupling torque component, the coupling torque component exposing the articulated coupling to a torque around a longitudinally extending geometric axis.

10. The method of claim 9, wherein the motion related parameters comprise an obtained vertical force value indicative of a vertical wheel force of at least one wheel of the second vehicle unit.

11. The method of claim 1, wherein the coupling force parameter comprises a vertical force component.

12. The method of claim 1, wherein the operational envelope is based on at least one of a maximum acceleration, maximum deceleration, and maximum steering angle.

13. A computer program product comprising program code for performing, when executed by a computer, the steps of claim 1 when the program is run on a computer.

14. A non-transitory computer readable medium comprising a computer program comprising program code, which when executed by a computer, performs the steps of claim 1 when the program means is run on a computer.

15. A control system for controlling a vehicle combination comprising a first vehicle unit, a second vehicle unit, and an articulated coupling connecting the first and second vehicle units to each other, wherein the control system is configured to be connected to a vehicle propulsion system, wherein the control system comprises control circuitry configured to:
- determine a coupling force parameter of the articulated coupling based on a combination of motion related parameters of the first vehicle unit and the second vehicle unit;
- select an operational envelope for the vehicle combination based on the coupling force parameter; and
- transmit a control signal to a vehicle propulsion system, the control signal representing instructions to operate the vehicle combination within the operational envelope and proactively avoid exceeding the operational envelope.

16. A vehicle combination comprising a first vehicle unit, a second vehicle unit, an articulated coupling connecting the first and second vehicle units to each other, a vehicle propulsion system arranged to propel the vehicle during operation, and the control system of claim 15.

17. The vehicle combination of claim 16, wherein the first vehicle unit is an autonomously controlled vehicle.

* * * * *